Patented Oct. 14, 1930

1,778,033

UNITED STATES PATENT OFFICE

HANS MANNHARDT, OF CHICAGO, ILLINOIS, ASSIGNOR TO WILLIAM MANNHARDT, OF CHICAGO, ILLINOIS

REFRIGERATING MEDIUM

No Drawing.  Application filed August 8, 1929.  Serial No. 384,523.

The refrigerating media used in mechanical refrigeration have become a public health problem. The fire and explosion hazards which accompany the use of methyl and ethyl chlorides as refrigerating media are well known. The toxic properties of the refrigerating media are an important factor since the compressing means are used in the home and industry where users are exposed to the contaminated atmosphere caused by escaping vapor.

The greatest hazard is encountered where the refrigerating medium is both toxic and explosive and when the vapor does not possess sufficient warning properties to prevent serious unconscious exposure and suffocation.

I have found that sulphur hexafluoride ($SF_6$) is a practical refrigerating medium entirely devoid of the various hazards which are found in the media heretofore used. The sulphur hexafluoride gas is inert, non-toxic and non-inflammable. At the same time the gas possesses the necessary physical characteristics for mechanical refrigeration.

I claim:

1. The refrigerating method which comprises liberating, subject to control, at a low pressure liquid sulphur hexafluoride artificially held liquid under a sufficiently high pressure.

2. The method of refrigeration which comprises liberating at atmospheric pressure liquid sulphur hexafluoride held liquid under pressure.

3. The mechanical refrigeration method which consists in liquefying sulphur hexafluoride gas under pressure and releasing same under appropriate control for restoration to its gaseous state to produce cold.

4. A non-explosive and non-toxic refrigerating medium adapted for ready use to produce extraordinary low temperatures by evaporation upon diminishing its artificial tension to that of atmospheric pressure, and consisting substantially of sulphur hexafluoride ($SF_6$).

5. A "mechanical" (pressure controlled) refrigerant of non-explosive and non-toxic character essentially comprising sulphur hexafluoride.

Signed at Chicago this 31st day of July, 1929.

HANS MANNHARDT.